Feb. 12, 1952 J. L. ALLISON 2,584,971
PULSE TIME POSITION FINDING SYSTEM
Filed May 7, 1949 7 Sheets-Sheet 1

INVENTOR
JOHN L. ALLISON
BY
ATTORNEY

Feb. 12, 1952 J. L. ALLISON 2,584,971
PULSE TIME POSITION FINDING SYSTEM
Filed May 7, 1949 7 Sheets-Sheet 3

Fig. 4.

INVENTOR
JOHN L. ALLISON
BY
ATTORNEY

INVENTOR
JOHN L. ALLISON
BY
ATTORNEY

Feb. 12, 1952 J. L. ALLISON 2,584,971
PULSE TIME POSITION FINDING SYSTEM
Filed May 7, 1949 7 Sheets-Sheet 5

INVENTOR
JOHN L. ALLISON
BY
ATTORNEY

Feb. 12, 1952

J. L. ALLISON 2,584,971

PULSE TIME POSITION FINDING SYSTEM

Filed May 7, 1949

INVENTOR
JOHN L. ALLISON
BY RPMorris
ATTORNEY

Patented Feb. 12, 1952

UNITED STATES PATENT OFFICE 2,584,971

PULSE TIME POSITION FINDING SYSTEM

John L. Allison, Nutley, N. J., assignor to International Standard Electric Corporation, New York, N. Y., a corporation of Delaware Application May 7, 1949, Serial No. 91,894

16 Claims. (Cl. 343—112)

This invention relates to an improved method of and means for determining and locating a source or sources of electromagnetic waves in general, and atmospheric disturbances in particular, by utilizing a pulse time-difference position-finding system, i. e. a system utilizing the difference of arrival of the waves at the several locations of a special network of receivers.

It is desirable, for meteorological predictions, to determine the location of localized electromagnetic atmospheric disturbances, hereinafter called "sferics," as soon as they occur. Attempts to use conventional direction finders for this purpose have not been entirely successful. When sferics occur in rapid succession, it is very difficult for the several operators of a direction-finding network to synchronize on the same sferic. The time consumed in plotting and evaluating the fixes further reduces the value of the information obtained. Moreover, with antennas of convenient size, sferics direction finders have large errors at times, due to ionospheric propagation phenomena.

Objects of the present invention are: to provide an improved pulse time-difference position-finding system which operates automatically and which eliminates the large degree of probable error in the human equation; to provide a system of the type specified which produces an instantaneous visual indication of the source of a sferic; to provide such a system which produces a permanent photographic record of the source of a sferic and/or which shows the source of a sferic on a map; to provide a system which minimizes errors due to ionospheric propagation phenomena; to provide a system of the type specified which covers the entire area of interest without ambiguities; to provide a system which operates at high speed and which responds to sferics which are spaced closely together in time.

According to the several features of this invention there is provided a meteorological observation system comprising a plurality of geographically separated observation stations each provided with a receiver responsive to electromagnetic atmospheric disturbances and a control station at which the difference in time of arrival of the disturbance at pairs of said stations is employed to move an electron beam parallel to orthogonal coordinates and then project the beam on a screen.

Another aspect of this invention relates to a system which is adapted to disable for a short interval of time one or more of the receivers after each electromagnetic disturbance is received, thereby preventing succeeding disturbances from interfering with the response to the disturbance first received.

Another feature of this invention relates to a sweep circuit for moving an electron beam from a reference position in response to the reception of one signal before the reception of a second signal and for moving the beam in the opposite direction upon the reception of said signals in the reverse order.

A further feature of this invention comprises the provision of means for receiving electromagnetic disturbances by a plurality of geographically separated receivers and then controlling the electron beams in a plurality of cathode ray tubes under control of the time of arrival of the disturbance at the respective receivers so that the beams will be deflected in one or more of the tubes to a position to indicate the location or source of the disturbance, the beams in the other tubes being positioned off the screen or out of the field of view.

Briefly, in accordance with one specific embodiment of this invention, a plurality of electromagnetic receivers responsive to disturbances of the type to be observed are located at geographically separated positions in the area or region of observation. The receivers are arranged to respond to each disturbance which exceeds a predetermined amplitude and which does not follow too soon after a previous disturbance. After each disturbance the receivers or the system is blocked or made insensitive to succeeding disturbances while the system is responding to the previous disturbance so that any succeeding disturbances which arrive at the receivers during this interval will not interfere with the operation of the system in accurately indicating the origin or location of the previous disturbance.

Each of the receivers is provided with or has associated with it equipment to limit the amplitude of the disturbances and repeat or relay the disturbances when so limited to a control station. The control station may be located at one of the receivers or it may comprise a separate station. In one embodiment the relayed signals are transmitted to the control station by transmission systems, paths, and equipment employed in the so called "Loran" position finding systems. Of course any equivalent transmission system may be used to transmit the signals from the various receiving devices to the control station or location so long as the transmission system and paths are capable of transmitting the necessary or desired signals.

At the control or central station the signals from the outlying receivers are amplified and shaped and then employed either with or without additional delay to control the electron beam in one or a plurality of electron tubes. The additional delays are provided either at the various receivers or at the control station, or at both places, to compensate for different times of transmission from the receivers to the control location and in part to more readily control the electron beams in the cathode ray tubes. The origin or location of each disturbance is indicated by one or a plurality of cathode ray tubes. The screens of these tubes represent or have superimposed upon them maps of a portion of the region or area under observation. These portions are arranged so that they overlap one another along their boundaries. The electron beam of each of these tubes is normally held near the center of the screen and is reduced in intensity, so that it is not visible. The beam of each of the tubes is moved along or parallel to each of two orthogonal axes. The signals received from various pairs of stations are employed to control the sweep circuits which move the beams parallel to the various axes of the screens of the tubes.

The electron beam in each of the tubes is moved in response to each disturbance in the direction to indicate the origin of the disturbance. However, except for the overlap in the boundary regions the beams will move off of all of the screens except the one which shows the origin or location of the disturbance. In the case of the disturbance occurring in the boundary regions the beam will remain on the screens of two or at most three of the tubes.

After the beams have been positioned to indicate the location or origin of the disturbance the intensity of all the beams is increased so that they may be observed and also so that they will affect photographic material in case it is desired to make a permanent record of the indication. However only the beams that are positioned on their screens will be visible at this time.

The intensities of the beams are maintained at a high level only momentarily after which all of the beams are returned to their original position and the system is unblocked so it will be ready to respond to the next disturbance. The system will then respond to the next disturbance in the same manner as described above.

Further objects and advantages of the present invention will become apparent from the following detailed description of a preferred embodiment thereof, when read in conjunction with the accompanying drawings wherein.

Figure 2:
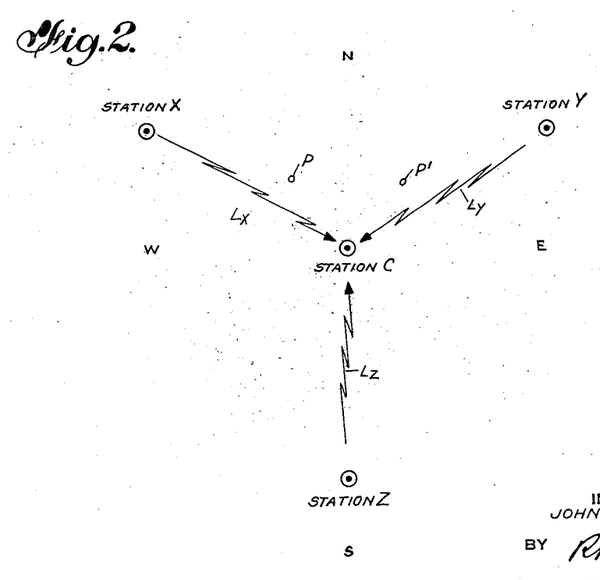
Fig. 2 shows one possible distribution of stations (four stations being shown in this example)

In the particular system described herein, position-finding is accomplished on the basis of the time-difference of arrival of a sferic at the several locations of a special network of four stations X, Y, Z and C, which are distributed as shown in Fig. 2. I wish to make it clear, however, that other numbers of stations in other distributions will yield substantially the same information when used in a pulse time-difference position-finding system according to the teachings herein.

The four-station system shown in Fig. 2 comprises three outlying stations X, Y, Z, which may be located on radii approximately 120° apart, and may be situated approximately 500 miles from the centrally located fourth station C, known as the control station.

Each of the three outlying stations X, Y, Z contains a sferics receiver and a link pulse transmitter which is triggered each time a sferic is received by its sferics receiver. The control station C contains a sferics receiver and also three link receivers to receive pulses from the link transmitters of stations X, Y, and Z. The link transmitters and link receivers are the same as used in Loran practice.

The information obtained by this network of four sferics receivers and associated links indicated on Fig. 2 is displayed by an orthogonal progressive sweep indicator, as will be understood from the following discussion.

Figure 7:
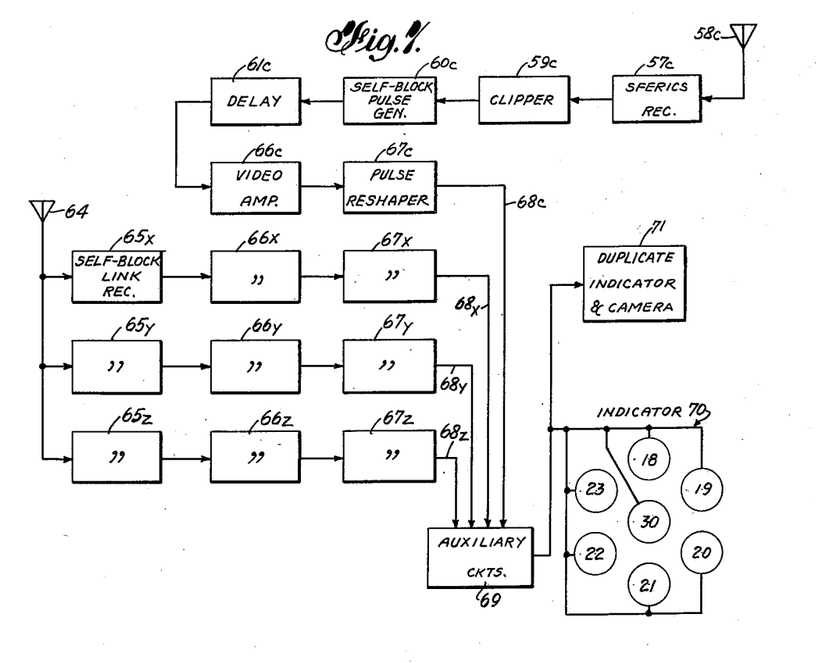
Fig. 7 is a block diagram of the central station of a four-station pulse time-difference position-finding system.

Each of four stations X, Y, Z and C contains an aperiodic sferics receiver which may be designed, for example, to respond to all signals from 100 cycles per second to 12,000 cycles per second. In such case, a 12,000-cycle low-pass filter may be included at each receiver to prevent response to very-low frequency communications transmitters. Referring to Fig. 7, which shows a block diagram of the system, the sferics receivers may be transformer-coupled audio-frequency amplifiers. Each of the sferics receivers has in its output circuit a standard constant amplitude clipper which may be adjustable, if desired. If adjustable, each clipper is made adjustable in discrete and identifiable steps, so that the four stations X, Y, Z, and C of Fig. 2 can operate at all times at the same level of clip.

Figure 7A:
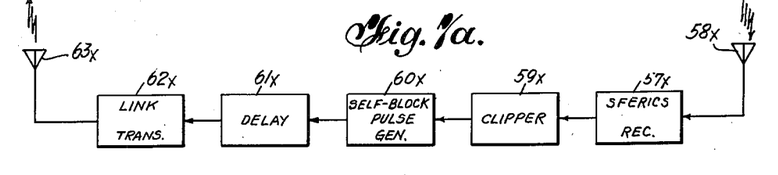
Fig. 7a is a block diagram of an outstation of the same system.

As indicated in Figs. 7 and 7a, each sferics receiver triggers a self-blocking pulse generator, provided that the receiver output attains the amplitude set by the constant-amplitude clipper. The pulse generators at stations X, Y, and Z (Fig. 7) actuate link transmitters which operate on three different radio frequencies. These three frequencies are higher than the sferics frequencies used, but are sufficiently low to permit ground-wave transmission from the outlying stations to control station C.

Each link transmitter, after being triggered, remains blocked for a suitable time interval such as 9 milliseconds and each link receiver at the control station remains blocked for a suitable slightly shorter interval. The latter blocking interval insures that the sky wave is not received by the link receiver.

Although the sferic has most of its energy in the lower frequencies, the sferic also contributes noise in the part of the spectrum used by the link. For this reason, the sferics receivers are followed by delay circuits as indicated in Fig. 7a to permit each sferic to be completed before the link pulses are transmitted. These delay circuits may be of the standard multivibrator type. The pulse re-shapers are the same as used in radiolocation techniques.

The outstation shown in Fig. 7a, assumed to be station X (which is identical with stations Y and Z), comprises a sferics receiver 57x provided with an antenna 58x responsive to atmospheric disturbances. The receiver works into the clipper 59x which in turn feeds the self-blocking pulse generator 60x. The latter, through the intermediary of a delay circuit 61x, feeds the link transmitter 62x provided with a link antenna 63x. Link antenna 63x is preferably directive.

The elements of central station C corresponding to elements 57x through 61x of the outstation X are indicated in Fig. 7 at 57c through 61c, respectively. The central or control station furthermore comprises a link antenna 64 feeding three self-blocking link receivers 65x, 65y and 65z associated with outstations X, Y and Z, respectively. Each link receiver as well as the delay circuit 61c works into a respective video amplifier 66x, 66y, 66z and 66c, these amplifiers being connected to pulse reshapers 67x, 67y, 67z and 67C. The last-mentioned circuits feed pulses by way of conductors 68x, 68y, 68z and 68c to a system of auxiliary circuits 69 associated with a visual indicator 70 and with a control indicator 71 provided with a recording device, for example a camera. The auxiliary circuits 69 will be further described in connection with Figs. 8 and 9. Indicator 70 is provided with seven cathode ray tubes the screens of which are schematically illustrated at 18, 19, 20, 21, 22, 23 and 30, referred to more in detail in connection with Fig. 3.

The additional delay 61c inserted before the video amplifier of the control station simulates the 500-mile propagation path of the three links. It will be understood that a different value of delay must be used if the propagation path is greater or less than the 500-mile distance which was chosen for purposes of discussion. The video amplifiers are the same as used in Loran practice.

The four video amplifiers indicated at the control station in Fig. 7 provide outputs in the form of uniformly shaped pulses. In the described system, these pulses have a maximum length of 10 microseconds, a minimum amplitude of 40 volts, and a minimum source impedance of 150 ohms.

Figure 3:
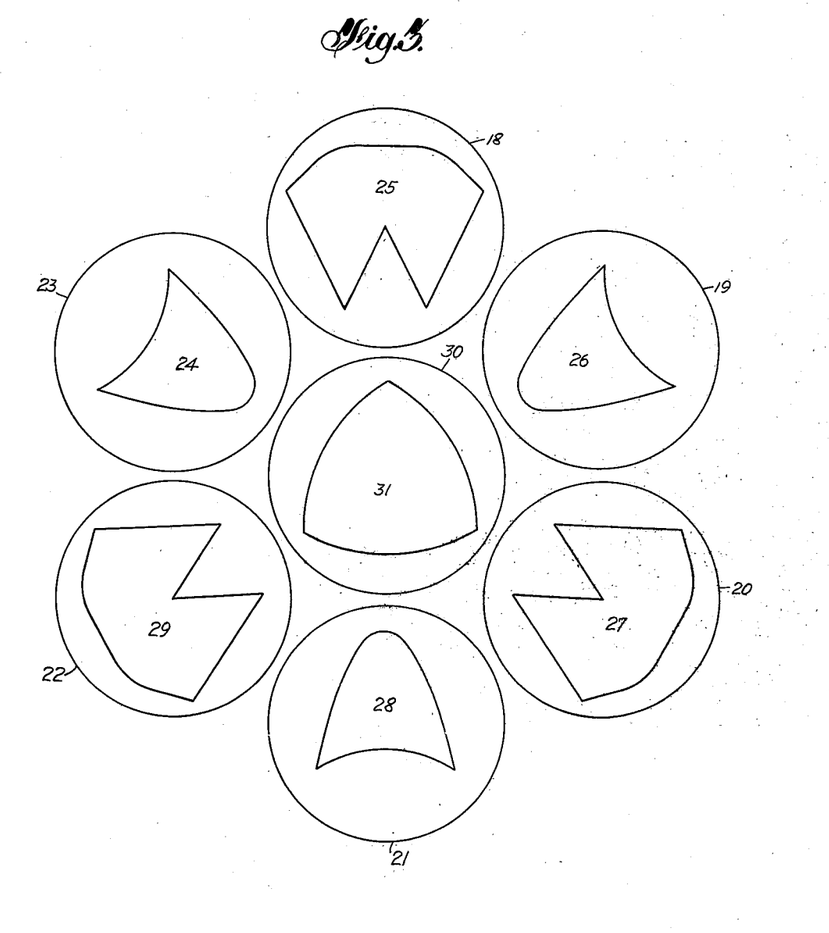
Fig. 3 represents the resulting mosaic map when seven oscilloscopes are used.

Fig. 2 shows the geographical layout of stations X, Y, Z, and C, the link circuits being indicated at Lx, Ly, and Lz. The arrangement shown provides optimum information from four stations of given base-line distance. There are four possible combinations of three stations each, and each three station combination provides unique position determinations in certain discrete sections of the entire area as indicated in Figs. 1 and 3.

Figure 1:
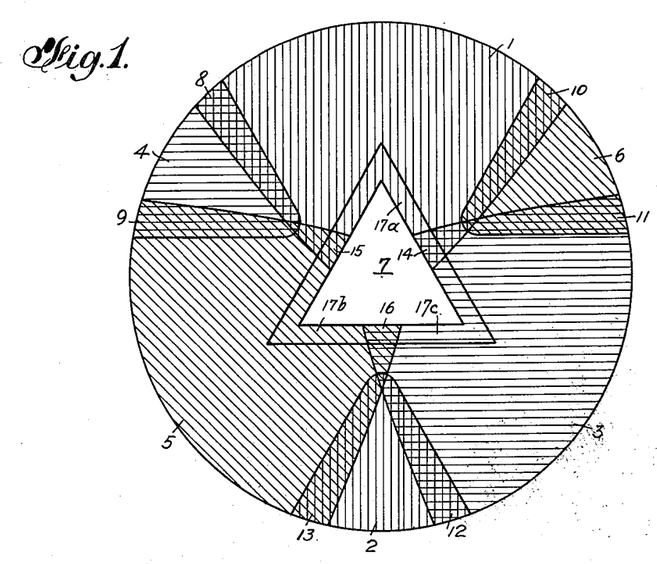
Fig. 1 represents an undistorted map (disregarding the distortion due to curvature of the earth) of a circular region, with functional sections differentiated by distinguishing section linings.

The combination of the three outlying stations X, Y, and Z provides unique position determinations in a triangular central zone 7 as shown in Fig. 1. Each of the three other three-station combinations provides unique position determinations in two unconnected regions as shown by the similarly cross-hatched areas of Fig. 1: 1, 2; 3,4; and 5, 6.

The resulting seven regions include the entire 2000-mile radius area chosen for this example, and provide a safe amount of overlap at the edges of each region, indicated in Fig. 1 at 8, 9; 10, 11; 12, 13; 14, 15, 16; and 17a, 17b, 17c.

It will be apparent to those skilled in the art, that four-station combinations of two pairs may be used instead of three of the three-station combinations, with resulting differences in shape and map-projection of the individual regions, but with the same coverage.

The orthogonal progressive sweep indicator takes the information of a sferic's location obtained from the four three-station combinations and displays it upon the cathode-ray oscilloscope which represents that region, as shown in Fig. 3. If the sferic occurs where two regions overlap, the display will appear on two oscilloscopes. Each screen is in the form of a map 24, 25, 26, 27, 28, 29, 31 respectively laid out on oscilloscopes 18, 19, 20, 21, 22, 23, 30. It is convenient, although not necessary, to color the overlap sections suitably, in order to indicate on which other oscilloscope the indications occur.

The pairs of unconnected regions recited above and indicated in Fig. 1 receive information from the same three-station combinations. Each pair of unconnected regions could be displayed on the same cathode-ray screen, but in order that the seven regions fall on positions more nearly corresponding to their actual positions on an undistorted continuous map, seven oscilloscopes are used instead of four, with the resulting discontinuous mosaic shown in Fig. 3. Typical circuit means used to obtain indication upon a particular oscilloscope are discussed at a later point in the specification.

Figure 4:
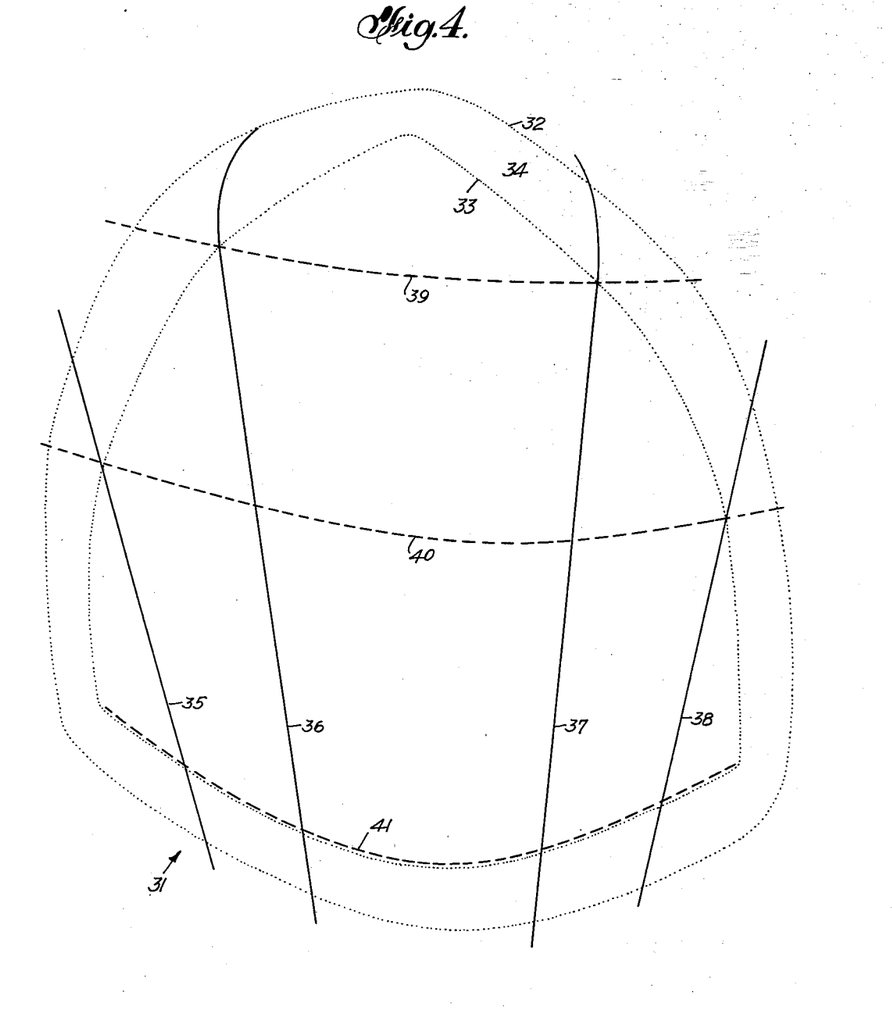
Fig. 4 represents a map of the central triangular region as it appears on one oscilloscope. The meridians are shown as solid lines, with the lines of latitude formed by broken lines.

A map of the central triangular region is indicated in Fig. 4, as it appears on oscilloscopes 30 of Fig. 3. The location of a sferic within this area is determined by pulses from the three outlying stations X, Y, and Z of Fig. 2. Meridians are represented in Figs. 4, 5, and 6 as solid lines 35, 36, 37, 38 and lines of latitude are represented as broken lines 39, 40, 41.

Figure 5:
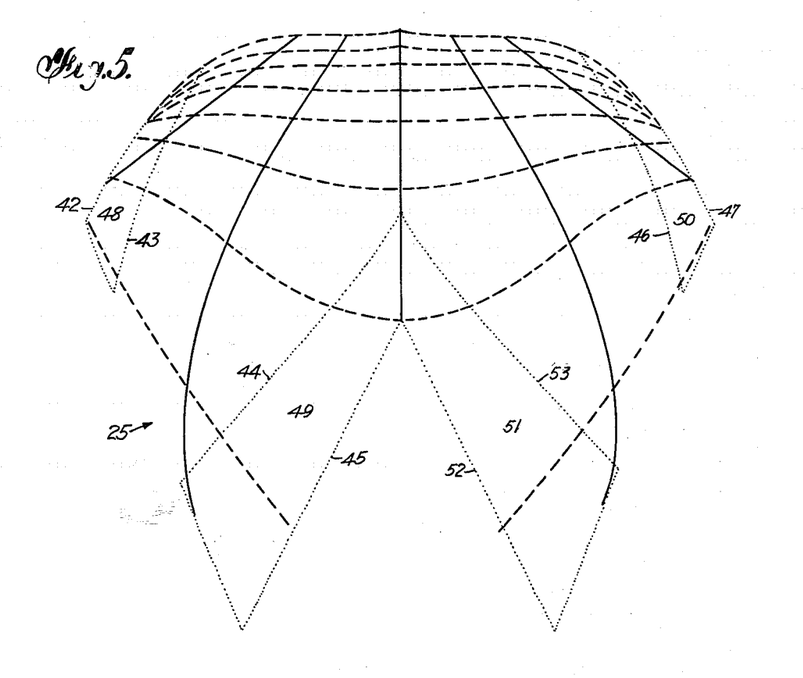
Fig. 5 represents a map of one of a pair of unconnected regions, as it appears on another oscilloscope.

A map of one of the two unconnected regions is represented in Fig. 1 at 1 and in Fig. 5 as it appears on an oscilloscope such as 18 in Fig. 3. This region is covered by information from the central station C and from two of the outlying stations such as X, and Y of Fig. 2. These same three stations cover another unconnected region such as the region represented at 2 in Fig. 1 and at 23 in Fig. 3 and Fig. 6. The regions shown in Figs. 5 and 6 could be displayed on the same oscilloscope, as mentioned above. The four other oscilloscopes such as 19, 20, 22 and 23 in Fig. 3 display maps analogous to those shown in Figs. 5 and 6, but for regions separated by 120° and 240° respectively. The areas of such regions as shown in Fig. 4, 5 and 6 which are duplicated by overlapping areas on the contiguous regions, as indicated at 34, 48, 49, 50, 51, 54, and 55, are shown bounded by dotted lines 32, 33; 42, 43; 44, 45; 46, 47; 52, 53; 56, 57; and 58, 59.

Figure 6:
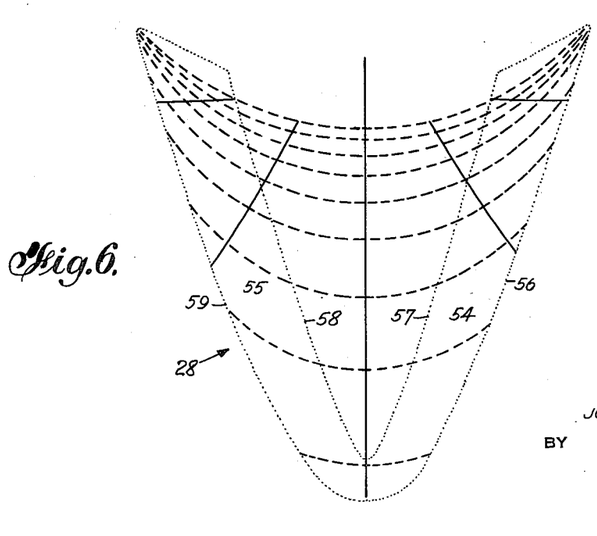
Fig. 6 represents the other unconnected region covered by the same three stations.

Figs. 4, 5, and 6 show that the maps appear distorted on the screens of the oscilloscopes. This distortion is a measure of the non-uniformity of precision which a finite number of stations will necessarily produce over a finite area, using pulse time-difference position-finding.

The maps, if left without any corrective distortion, would provide an exact measure of the precision of the system, in that equal distances in any direction then indicate equally probable deviations from a true position determination. In order to make the maps on the oscilloscope screens appear more natural to those accustomed to reading standard map projections, a slight corrective distortion is added by a simple skewing accomplished through constant amplification of the cathode-ray deflection along one axis.

The resulting mosaic of seven sections on the seven oscilloscopes as represented in Fig. 3 is viewed by the operator or operators, who observe the location of any sferic as a point of light which flashes momentarily at that place on the oscilloscope screen which corresponds to the location of the sferic. In addition to this instantaneous indication, an identical set of oscilloscopes may be continuously photographed by the camera 71 represented in Fig. 7, e. g. on 35-mm. motion picture film, preferably with the use of a square frame. This film is kept stationary for a suitable length of time, such as $\frac{1}{10}$ second, with shutter open, and then is moved to the next frame during a suitable interval, such as $\frac{1}{50}$ second, with closed shutter.

In this manner, the record of the indicator is kept for $\frac{5}{6}$ of the total time, and when several sferics occur within the $\frac{1}{10}$-second stationary interval, they are integrated on the film. Because the film motion is regular, intermittent, and not synchronized with the irregular flashes of the sferics, the $\frac{5}{6}$ of the total sferics which are photographed form a perfect sample of the total sferics visually observed.

Each of the seven oscilloscopes 18, 19, 20, 21, 22, 23 represented in Fig. 3 is actuated by pulses from a combination of three stations represented as X, Y, Z, and C in Fig. 2, and the flash of light representing a sferic course appears at the proper location on the screen by the action of two orthogonal sweep circuits which are triggered successively, and a cathode-ray grid circuit which is triggered at the end of the second sweep. Accordingly, the sferic appears on the screen of one cathode-ray tube, unless it falls in the overlap region, in which case it appears on more than one screen, but in either case, the location of the sferic is displayed on the proper point of the map which is drawn on each screen.

A sferic which occurs in the central zone 7, represented in Fig. 1, operates the orthogonal progressive sweep indicator 72 (Fig. 8) by means of pulses from station X, Y, and Z, represented in Fig. 2. The central station C does not contribute information to indications within this area, as is apparent from inspection of Fig. 8 which shows a block diagram of the sweep circuits for the deflecting plates for the tube 30 of Fig. 3, with a common clean-up and intensity control circuit.

Figure 8:
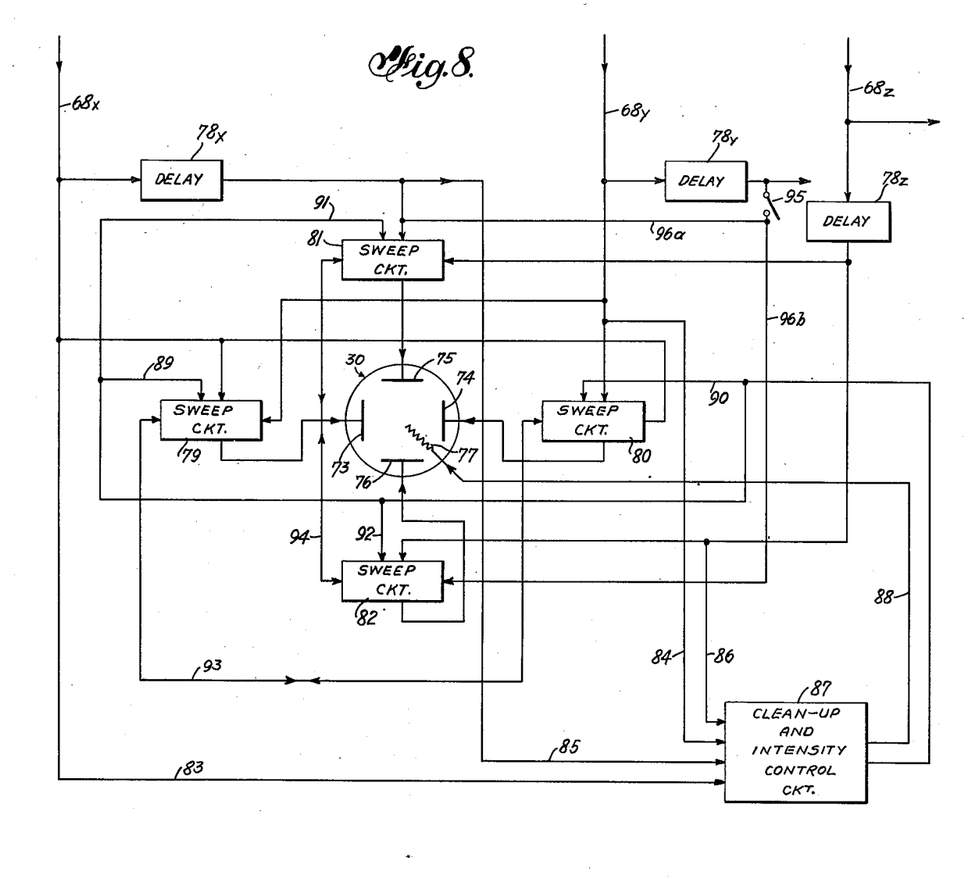
Fig. 8 is a block diagram of the sweep circuit for one pair of deflecting plates, with common clean-up and firing circuits.

The cathode ray tube 30 is shown in Fig. 8 provided with a pair of horizontal deflecting electrodes 73, 74, a pair of vertical deflecting electrodes 75, 76 and an intensity control electrode or grid 77. Connected to each conductor 68$x$, 68$y$ and 68$z$ (compare Fig. 7) is a delay circuit 78$x$, 78$y$, and 78$z$, respectively. The delay of these circuits may be five milliseconds and in any case should be long enough to permit one pair of the orthogonal sweep circuits associated with the cathode ray tube to complete the deflection of the beam in one direction (e. g. horizontally) before triggering the other pair of sweep circuits to deflect the beam in the other direction (e. g. vertically); yet this delay must also be short enough to prevent the leaking of any perceptible amount of charge off the corresponding deflecting electrodes until the composite sweep is completed.

Any pulse arriving from station X over lead 68$x$ is applied without delay to the left-hand horizontal sweep circuit 79, associated with electrode 73, as a starting pulse yet is also applied to the right-hand horizontal sweep circuit 80, associated with electrode 74, as a stopping pulse. The same pulse is also applied, after delay in circuit 78$x$, to the upper vertical sweep circuit 81, associated with electrode 75, as a starting pulse and to the lower vertical sweep circuit 82, associated with electrode 76, as a stopping pulse. A pulse from station Y, arriving over conductor 68$y$, is applied without delay to sweep circuit 80 as a starting pulse and to sweep circuit 79 as a stopping pulse. (Delay circuit 78$y$ applies this pulse to other sweep circuits, not shown, which are associated with some of the remaining cathode ray tubes of the indicator.) A pulse from station Z, arriving over conductor 78$z$ and passing through delay circuit 78$z$, is applied to sweep circuit 82 as a starting pulse and to sweep circuit 81 as a stopping pulse. (The same pulse is also applied directly to other sweep circuits, not shown.)

The pulses from conductors 68$x$ and 68$y$, delay circuit 78$x$ and delay circuit 78$z$ are also applied, via leads 83, 84, 85, and 86, to a clean-up and intensity control circuit 87 which over a lead 88 controls the grid 77 of the cathode ray tube and which over leads 89, 90, 91 and 92 acts upon the sweep circuits 79, 80, 81, and 82 to restore them to normal after having received a pulse over each of its input leads 83–86. Opposite sweep circuits 89, 90 and 91, 92 are further interconnected by leads 93, 94, respectively, to block the other sweep circuit after one of the sweep circuits of a pair has responded to a starting pulse.

The sweep indicator 72, shown in Fig. 8, is typical of similar sweep indicators associated with the other cathode ray tubes which, therefore, have not been specifically illustrated. All of these indicators are, however, schematically represented by the square 69 in the diagram of Fig. 7.

Briefly, the operation of the indicator is as follows:

Pulses due to a particular sferic are received over conductors 68$x$, 68$y$ and 68$z$ at intervals determined by the times of reception of the corresponding disturbance at stations X, Y, and Z, respectively. Referring back to Fig. 2, it will be apparent that the occurrence of a sferic at, say, point P will cause the emission of pulses from stations X, Y, and Z in that chronological order. The first pulse, arriving over conductor 68$x$ (Fig. 8), triggers the left-hand horizontal sweep circuit 79 in such manner that a steadily rising potential is applied by the latter to electrode 73, thereby progressively deflecting the beam of cathode ray tube 30 towards the left. A stopping pulse is also applied to the companion sweep circuit 80 which, however, has no effect since the latter circuit has not been operative. The second pulse arriving over conductor 68$y$, tends to trigger sweep circuit 80 which latter, however, has been rendered temporarily ineffected by a control signal transmitted from the sweep circuit 79 via connection 93. The pulse from conductor 68y also acts, however, as a stopping pulse upon the sweep circuit 79, thereby preventing a further increase in the potential of electrode 73. The beam of tube 30 is now concentrated upon a spot which lies substantially on the same meridian on map 31 (of Figs. 3 and 4) as the point P.

Shortly thereafter the delayed pulse from delay circuit 78x triggers the upper vertical sweep circuit 81 and is also applied as a stopping pulse to the sweep circuit 82 without, however, having any effect upon the latter. A steadily rising potential is now applied to electrode 75, thus progressively deflecting the beam upwards, while a control signal is sent to sweep circuit 82, rendering this circuit insensitive to the subsequently arriving pulse from delay circuit 78z. The last-mentioned pulse, however, inactivates the sweep circuit 81, thereby arresting the beam in a position substantially coinciding with the position of point P on the map 31. At this instant the arrival of the fourth pulse successively received by the circuit 87 over leads 83, 84, 85 and 86 actuates an intensity control means in this circuit to reduce momentarily the bias of grid 77, thereby rendering the spot on screen 31 visible to the observer. Immediately thereafter a signal is sent out from circuit 87 to all the sweep circuits, restoring the beam to its normal position at the center of the screen.

It will be apparent that, if the location of the sferic had been the point P' (Fig. 2) which is located symmetrically with respect to P, the order of pulses generated would have been Y, X, Z so that a starting pulse would have reached sweep circuit 80 before sweep circuit 79, thereby causing the beam to travel from the center of the screen towards the right (sweep circuit 79 being temporarily disabled over connection 93) until a stopping pulse was received by circuit 80 over conductor 68x. It will further be noted that under these circumstances the location of the beam in the north-south direction would be subject to some distortion, owing to the fact that the distance of point P' from station X is only slightly less than from station Z. This can be remedied to a large extent by closing switch 95 to provide auxiliary connections 96a, 96b, Fig. 8, between delay circuit 78y and sweep circuits 81, 82, respectively. In that case two starting pulses will be successively applied to sweep circuit 81 and two stopping pulses will be similarly applied to sweep circuit 82, from delay circuits 78x and 78y, respectively, but only the first starting or the first stopping pulse will be effective, as the case may be. Thus a disturbance in the north-east quadrant, for example, will actuate sweep circuit 81 by a starting pulse from delay circuit 78y and will subsequently inactivate the same by a stopping pulse from delay circuit 78x; conversely, a sferic from the south-west quadrant will actuate sweep circuit 82 by a starting pulse from delay circuit 78x while subsequently inactivating this sweep circuit by a stopping pulse from delay circuit 78z. With such an arrangement it will also be desirable to render sweep circuit 81 insensitive to the arrival of a second starting pulse after reception of the stopping pulse, for example by suitably broadening this latter pulse.

The portions of the screen of tube 30 outside the limits of map 31, as shown in Fig. 3, are areas of large distortion and are preferably made opaque to prevent flashes from appearing thereon.

The operation of the sweep circuits and of the clean-up and intensity control circuit 87 will be explained in greater detail in connection with Fig. 9, with particular reference to the horizontal sweep circuits 79, 80.

Figure 9:
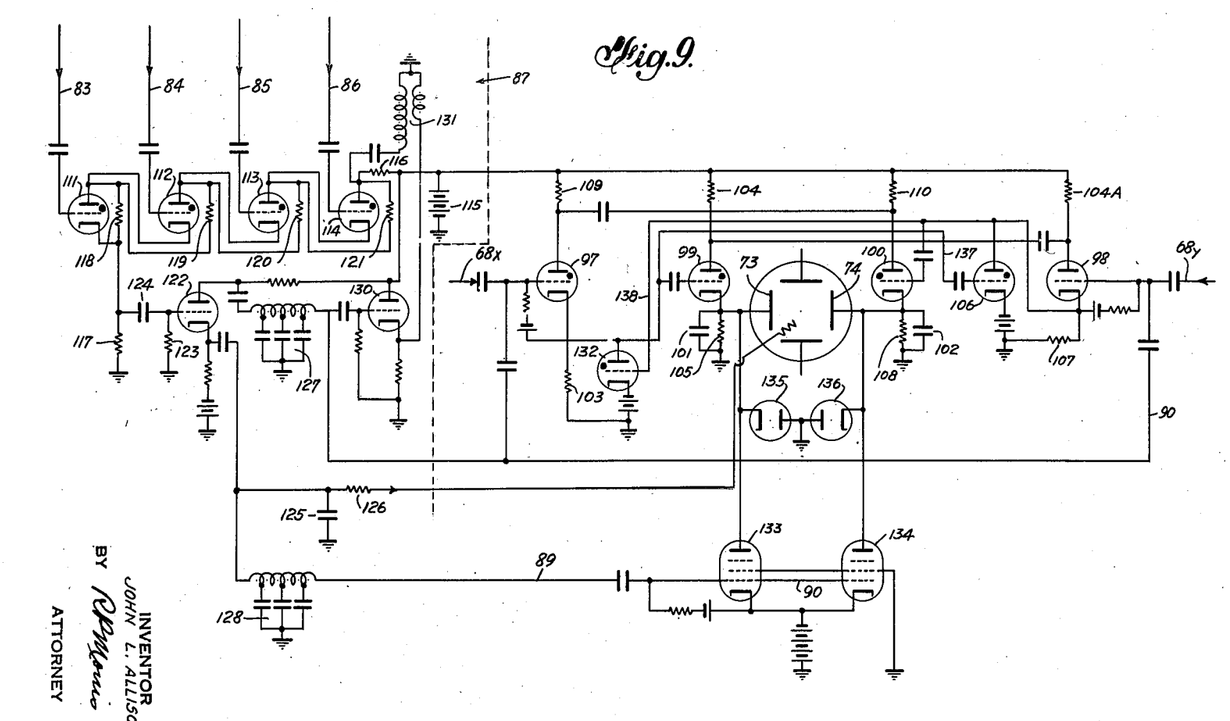
Fig. 9 is a schematic diagram of the sweep circuit for one pair of plates, with common clean-up and firing circuits.

Referring to Fig. 9, the sweep circuit which is to the right of the dotted line will be first discussed. Pulses from conductor 68x or from conductor 68y applied to cathode-follower tube 97 or 98, cause thyratron 99 or 100, respectively, to conduct and thus charge condenser 101 or 102 until the conducting thyratron is de-ionized by a negative pulse from the other station (Y or X).

Consider a positive pulse from station X to arrive first. Amplifier tube 97 then sends a positive pulse taken from its cathode resistor 103, to the grid of a thyraton 99, causing this thyratron to conduct and to start the potential of the left deflecting plate 73 to rise linearly in a positive direction as 101 charges at a rate determined by the anode resistor 104 of thyratron 99.

The resistance 105 connected across 101, is of a very high value, so that it does not affect the sweep potential during the brief period of deflection; during quiescent periods, however, this resistance serves to maintain the deflecting plates at zero potential.

The same positive pulse which ignites thyratron 99 also ignites thyratron 106, thereby effectively shorting out the cathode resistor 107 of vacuum tube 98. The negative pulse from the plate resistor 108 of tube 97 is applied to the plate of thyratron 100 but since 100 is not yet conducting, has no effect. Had a pulse from station Y arrived before the pulse from station X, the negative pulse under discussion would have been of use in de-ionizing the thyratron, as will be apparent from the following discussion of the pulse from Y.

A positive pulse from conductor 68y arrives after the positive pulse from conductor 68x (in the case under discussion) and is applied to the grid of amplifier tube 98. It is seen that tube 98 is symmetrically placed in the circuit with respect to tube 97, just described. Because the pulse from station X arrived at tube 97 first, the cathode resistor 107 of tube 98 has been effectively shorted out, so that a position pulse is not conducted to thyratron 100. However, if the first positive pulse had arrived from station Y, 100 would have been ignited, and tube 97 would have been disabled with respect to output from the cathode. Resistors 109 and 110 are the counterparts of resistors 105 and 104, respectively.

Although the cathode circuit of tube 98 is disabled, the positive pulse from conductor 68y can appear as an amplified negative pulse at the plate of tube 98 owing to the pressure of plate resistor 104A, and this negative pulse extinguishes thyratron 99. When thyratron 99 is extinguished, the charging current to condenser 101 ceases, and no further horizontal deflection takes place. Condenser 101 now holds the potential on the horizontal deflecting plates except for the negligible leakage through the resistor shunting 101.

Pulses passing through the five-millisecond delay circuits 78x, 78z and stations X and Z operate next to energize the vertical sweep circuits (not shown) but identical with the horizontal sweep circuits shown in Fig. 9. While vertical deflection takes place, the potential on the horizontal deflecting plate is maintained, the horizontal sweep circuit is now in an unenergized state, except that thyratron 106 is conducting. As will appear later, 100 will ultimately be extinguished after both the delayed pulses from X and Z have arrived. 106 is extinguished by action of the common clean-up and intensity control circuit 87 to the left of the dotted line in Fig. 9.

Thyratrons 111, 112, 113 and 114 are wired in series across the voltage supply 115 shown in Fig. 9. This series circuit includes a resistor 116 at the positive end and a smaller value resistor 117 at the ground end of the thyratron chain. A very high resistance 118–121 shunts each thyratron, so that, before a thyratron is ignited, a voltage drop is applied to the thyratron.

Pulse may arrive in either order from leads 83 and 84, followed by pulses in either order from leads 85 and 86. As each pulse arrives, it causes one of the thyratrons to ignite, which results in a small increase of current through the resistor 117. When the last of the four thyratrons is fired, there is a large increase of current through the resistor 117 which causes a large positive pulse to be applied to the grid of vacuum tube 122, because of the differentiating circuit 123, 124 in the grid circuit of tube 122. The very small pulses which may result from the firing of the first three thyratrons have negligible effect, it is only when the fourth thyratron is fired that the grid of tube 122 is pulsed sufficiently positive to operate the associated circuits.

The amplified pulse from the cathode of tube 122 unbiases the grid (unblanks the beam) of the cathode-ray tube through a condenser-resistor filter 125, 126 which permits the beam to remain unblanked for a longer time than if controlled directly by the sharp pulse.

The electron beam has thus been deflected horizontally a distance proportional to the time interval between pulses from conductor 68x and from conductor 68y, and then deflected vertically a distance proportional to the time interval between pulses from delay circuit 78x and from delay circuit 78z and finally made visible on the screen by the fourth pulse to be received through the network. The sweep and firing intensity control circuits are then returned to their initial condition, as follows:

Both the positive pulse from the cathode circuit of tube 122 and the negative pulse from the anode circuit of tube 122 pass through suitable delay lines, as shown in Fig. 9; the anode delay circuit 127 may be of the order of 10 microseconds, and the cathode delay circuit 128 may be of the order of 20 microseconds or more. The delay line 127 carries the negative pulse to the cathode-follower tube 130, and then through a pulse transformer 131 to the plates of the thyratrons 111, 112, 113 and 114. This amplified negative pulse is of sufficient magnitude to extinguish these four thyratrons.

The negative pulse from the delay line 127 is also led to the grids of the two tubes 97 and 98 of the sweep circuit. This negative pulse extinguishes tube 132 or 106, whichever was conducting, and returns the sweep circuit to its initial condition.

The positive pulse from the cathode circuit of tube 122, besides unblanking the beam of the cathode-ray tube passes through delay line 128 to provide sufficient time for the screen to become effectively illuminated. The output from this delay line proceeds to cleanup tubes 133 and 134 by way of leads 89 and 90, causing them to conduct momentarily and discharge condenser 101 or 102, whichever one held a charge. Diodes 135 and 136 prevent the deflecting plates from going negative while tubes 133 and 134 are conducting.

The connections 137 shown in Fig. 9, extending from the cathode of tube 97 to the grid of tube 106, and 138, extending from the cathode of tube 98 to the grid of tube 132, together representing the connection 93 shown in Fig. 8.

While I have described above the principles of my invention in connection with specific apparatus, it is to be clearly understood that this description is made only by way of example and not as a limitation upon the scope of my invention.

What is claimed is:

1. A method of determining the location of an atmospheric disturbance, comprising the steps of receiving electro-magnetic waves due to said disturbances at a plurality of spaced-apart observation points, transmitting a signal pulse to a control point from each observation point upon reception of said electromagnetic waves thereat, receiving said signal pulses at the control point, grouping the received signal pulses at the control point into pairs of pulses, and displacing an indicator over a map in a first direction by a distance substantially proportional to the spacing of the pulses of one pair and in a second direction by a distance substantially proportioned to the spacing of the pulses of another pair of pulses.

2. A method of determining the location of an atmospheric disturbance, comprising the steps of receiving electromagnetic waves due to said disturbance at not less than four spaced-apart observation points, transmitting a signal pulse to a control point from each observation point upon reception of said electromagnetic waves thereat, receiving said signal pulses at the control point, grouping the signal pulses received at the control point from a first group of not less than three observation points into a first and a second pair of pulses, grouping the signal pulses received at the control point from a second group of not less than three observation points into a third and a fourth pair of pulses, displacing a first indicator over a first map portion, representative of the area covered by said first group of observation points, in a given direction by a distance substantially proportional to the spacing of the pulses of said first pair and in a direction perpendicular thereto by a distance substantially proportional to the spacing of the pulses of said second pair, and displacing a second indicator over a second map portion, representative of the area covered by said second group of observation points, in a given direction by a distance substantially proportional to the spacing of the pulses of said third pair and in a direction perpendicular thereto by a distance substantially proportional to the spacing of the pulses of said fourth pair.

3. A system for determining the location of atmospheric disturbances, comprising a control station and a plurality of auxiliary stations, link means connecting said control station with each of said auxiliary stations, a receiver responsive to atmospheric disturbances at each of said stations, pulse generator means at each station adapted to be triggered by the respective receiver, pulse transmitting means including said link means for transmitting the pulses generated at each auxiliary station to said control station, indicator means at said control station, said indicator means including a movable element and first and second control means for deflecting said movable element in different directions, first circuit means for applying a first pair of pulses, successively derived from two of said pulse generator means to said first control means in such manner as to deflect said movable element in a first direction by a distance substantially proportional to the spacing of the pulses of said first pair, and second circuit means for applying a second pair of pulses, successively derived from two of said pulse generator means, to said second control means in such manner as to deflect said movable element in a second direction by a distance substantially proportional to the spacing of the pulses of said second pair.

4. A system according to claim 3 wherein said indicator means comprises a cathode ray tube.

5. A system according to claim 4 wherein said cathode ray tube is provided with a screen carrying a map of an area under observation by at least certain of said stations.

6. A system according to claim 5 wherein said indicator means comprises a plurality of cathode ray tubes each connected to have its beam deflected by pulses originating at different groups of not less than three stations, each of said cathode ray tubes being provided with a screen carrying a map of an area under observation by the stations of the respective group.

7. A system according to claim 3, further comprising delay means for rendering said second circuit means effective subsequent to the deflection of said movable element by said first control means.

8. A system according to claim 7 wherein said indicator means comprises a cathode ray tube, said movable element comprises the beam of said tube, said first control means comprises a first pair of deflecting elements for said beam, and said second control means comprises a second pair of deflecting elements for said beam, said indicator means further comprising blocking means normally rendering said beam invisible and third circuit means, responsive to the successive reception of said first and second pair of pulses, for momentarily disabling said blocking means subsequent to the deflecting of said beam by the second pair of deflecting elements.

9. A system according to claim 3 wherein each of said stations is provided with blocking means temporarily rendering said pulse generator means inoperative immediately after the generation of each pulse.

10. A system according to claim 3 wherein said link means include radio receiver means at the control station and blocking means associated with said receiver means for temporarily inactivating the receiver means to prevent reception of a sky wave.

11. A system according to claim 3 wherein each of said stations is provided with clipper means for making said pulse generator means responsive to received atmospheric disturbances of predetermined minimum amplitude only.

12. A system according to claim 3 wherein all of said clipper means are adjustable for varying said predetermined minimum amplitude.

13. In a radio location system the combination, with a plurality of sources of pulses occurring at times representative of the spacing of an unknown location from a plurality of fixed points, of a cathode ray tube provided with a pair of sweep circuits adapted to deflect the beam of said tube, first circuit means for applying a pulse from one of said sources to the first of said sweep circuits in such manner as to trigger the same into action, second circuit means for applying a pulse from another of said sources to the second of said sweep circuits in such manner as to trigger the same into action, third circuit means for applying a pulse from said one source to said second sweep circuit in such manner as to de-activate the same, fourth circuit means for applying a pulse from said other source to said first sweep circuit in such manner as to de-activate the same, and fifth circuit means interconnecting said sweep circuits for rendering either of said sweep circuits non-responsive to said pulses in the active condition of the other sweep circuit.

14. In a radio location system the combination, with a group of not less than three sources of pulses occurring at times representative of the spacing of an unknown location from not less than three fixed points, of a cathode ray tube provided with two sweep circuits adapted to deflect the beam of said tube in two orthogonal directions, first circuit means for applying a first pair of pulses, derived from a first combination of two of said sources, to the first sweep circuit in such manner as to produce a deflection of said beam substantially proportional to the spacing of the pulses of said first pair, second circuit means for applying a second pair of pulses, derived from a second combination of two of said sources, to the second sweep circuit in such manner as to produce a deflection of said beam substantially proportional to the spacing of the pulse of said second pair, and intensity control means for maintaining said beam invisible until both of said deflections have been completed.

15. The combination according to claim 14, comprising delay means for delaying said second pair of pulses until after the deflection of said beam by said first sweep circuit has been completed.

16. The combination according to claim 15 wherein the number of said sources is three, said delay means being inserted between said second sweep circuit on the one hand and the first and the third of said sources on the other hand, the first and the second of said sources being connected to said first sweep circuit by said first circuit means without substantial delay.

JOHN L. ALLISON.

REFERENCES CITED

The following references are of record in the file of this patent:

UNITED STATES PATENTS

| Number | Name | Date |
| --- | --- | --- |
| 2,428,966 | Gage | Oct. 14, 1947 |
| 2,480,152 | Mandel | Aug. 30, 1949 |
| 2,489,251 | Anast | Nov. 29, 1949 |